Nov. 24, 1936. S. J. NORDSTROM 2,062,068
VALVE
Filed June 29, 1931 3 Sheets-Sheet 1

INVENTOR
Sven Johan Nordstrom
BY English and Studwell
ATTORNEYS

Nov. 24, 1936.  S. J. NORDSTROM  2,062,068
VALVE
Filed June 29, 1931  3 Sheets-Sheet 2

INVENTOR
Sven Johan Nordstrom
BY
English and Studwell
ATTORNEYS

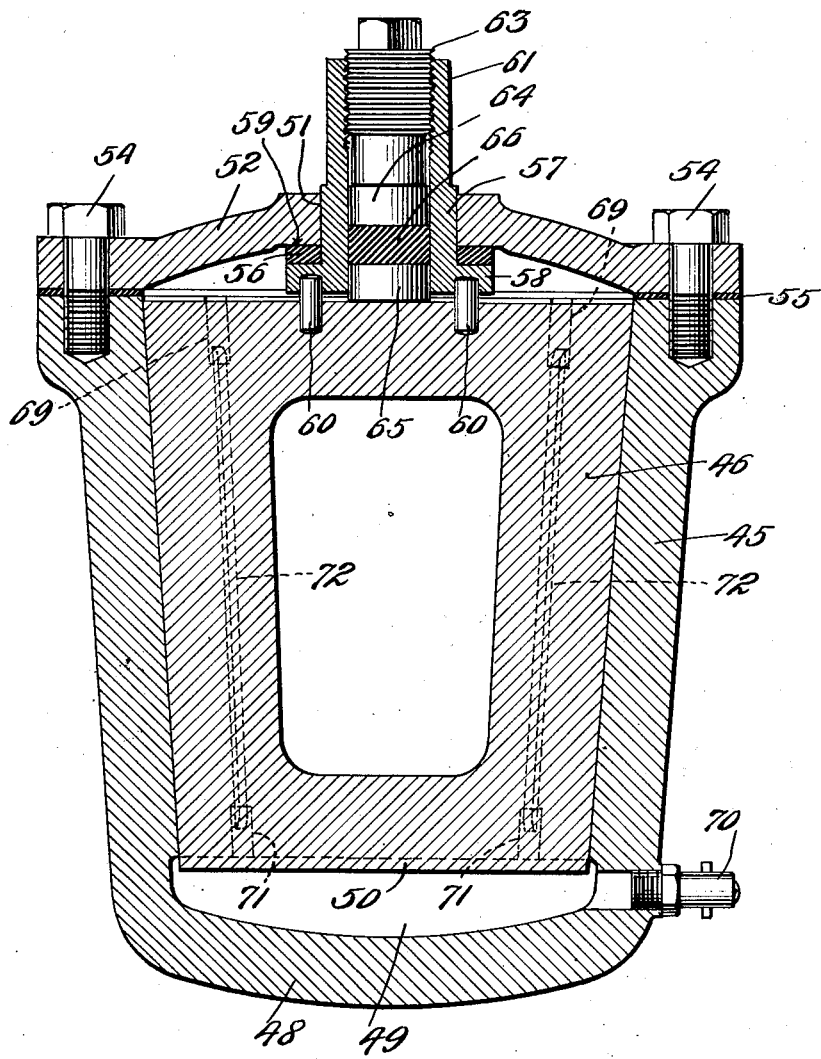

Patented Nov. 24, 1936

2,062,068

UNITED STATES PATENT OFFICE 2,062,068

VALVE

Sven Johan Nordstrom, Piedmont, Calif., assignor to Merco Nordstrom Valve Company, San Francisco, Calif., a corporation of Delaware Application June 29, 1931, Serial No. 547,497

28 Claims. (Cl. 251—93)

This invention relates to an improvement in plug valves of the conventional type (as distinguished from the inverted plug type) in which lubricant under pressure is utilized for moving the plug longitudinally of its seat in the casing.

One object of the invention is to produce a pressure lubricated plug valve which is more suitable for high pressure service than such valves as heretofore constructed. In accordance with this object one feature of the invention resides in providing the valve with a plug-turning member having a surface adapted to bear against the inner surface of the casing and a threaded or equivalent member for moving the plug in one direction, to force it against its seat, and the plug-turning member in the opposite direction to establish a tight joint between it and the casing. Another object of the invention is to provide pressure lubricated plug valves of the conventional type with improved means for resiliently holding the plug against its seat. In valves of this type embodying the pressure lubricated feature as heretofore constructed the resilient means has performed the double function of holding the plug against its seat and sealing the joint between the shank of the plug and the casing. Owing to the alternate compression and expansion of the resilient packing each time the plug is moved longitudinally of its seat, especially in services involving relatively high pressures and temperatures, the packing rapidly loses its resiliency, resulting in leakage and frequent necessity for adjustment and renewal. Wearing of the packing is also caused by the frictional engagement between the rotatable shank of the plug and the inner surface of the packing each time the plug is turned to open and close the valve. In the valve of the present invention the use of and necessity for resilient packing around the shank of the plug is eliminated by making the cover for closing the larger end of the tapered seat in the casing resilient and causing it to act against the plug to hold it yieldingly against the seat. The invention is more fully described hereinafter and is particularly pointed out in the appended claims.

Figure 1:
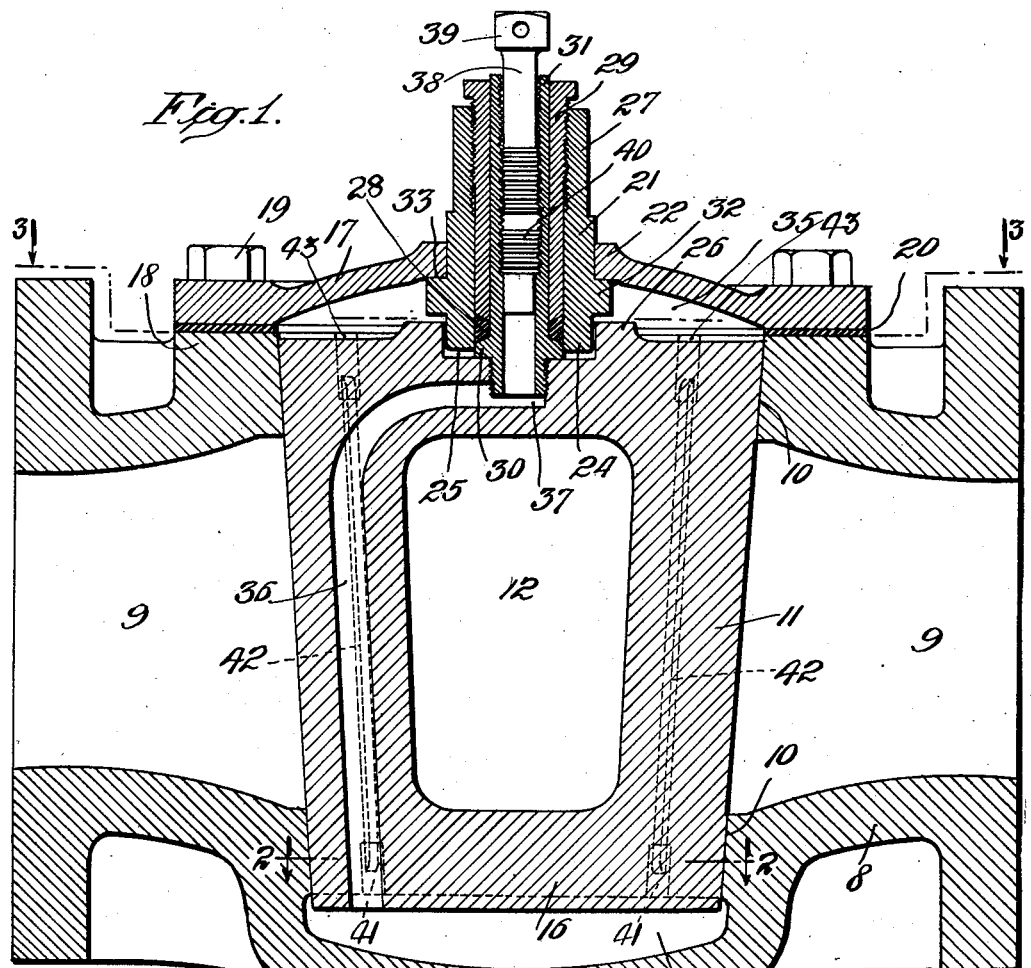
Figure 2:
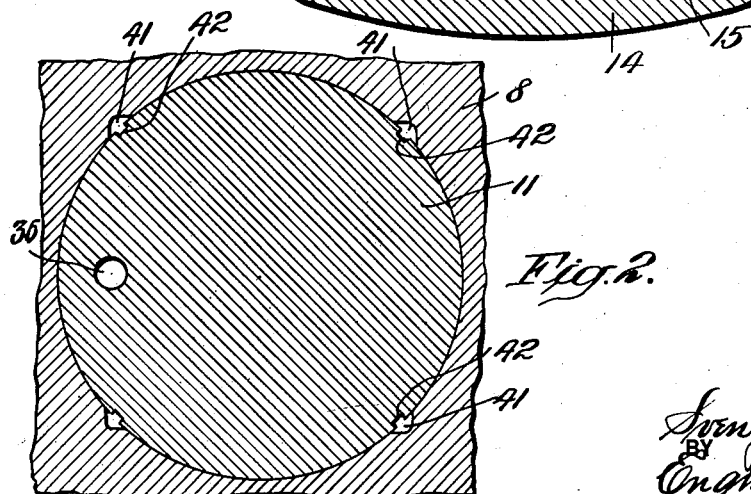
Figure 3:
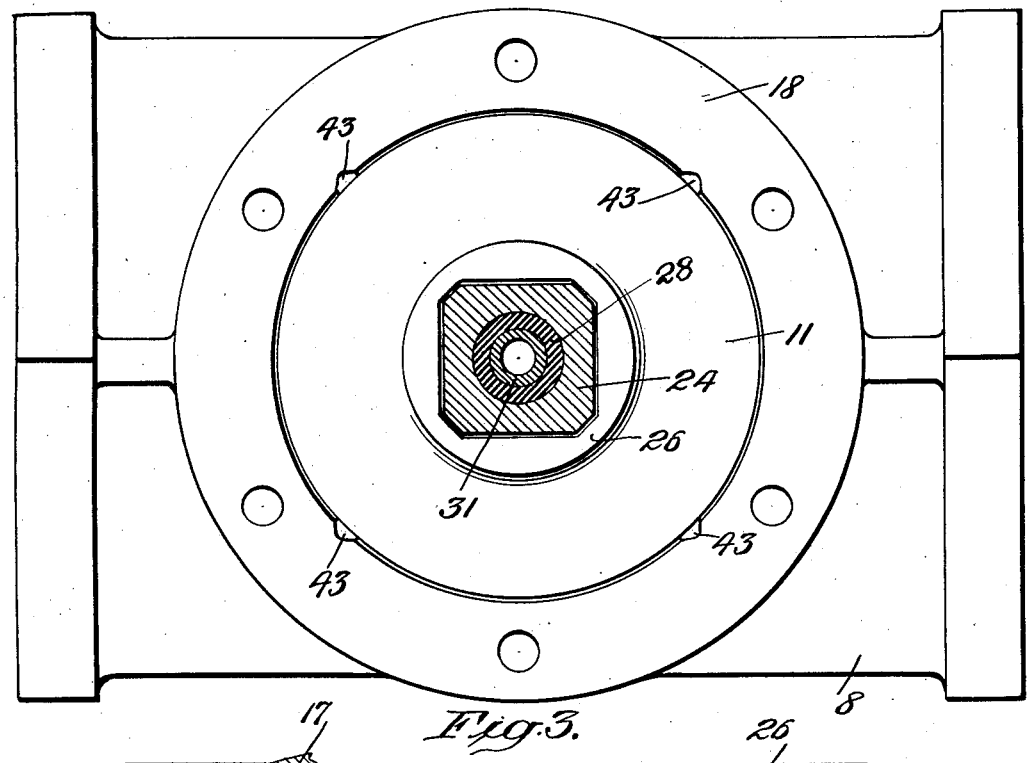
Figures 4, 5:
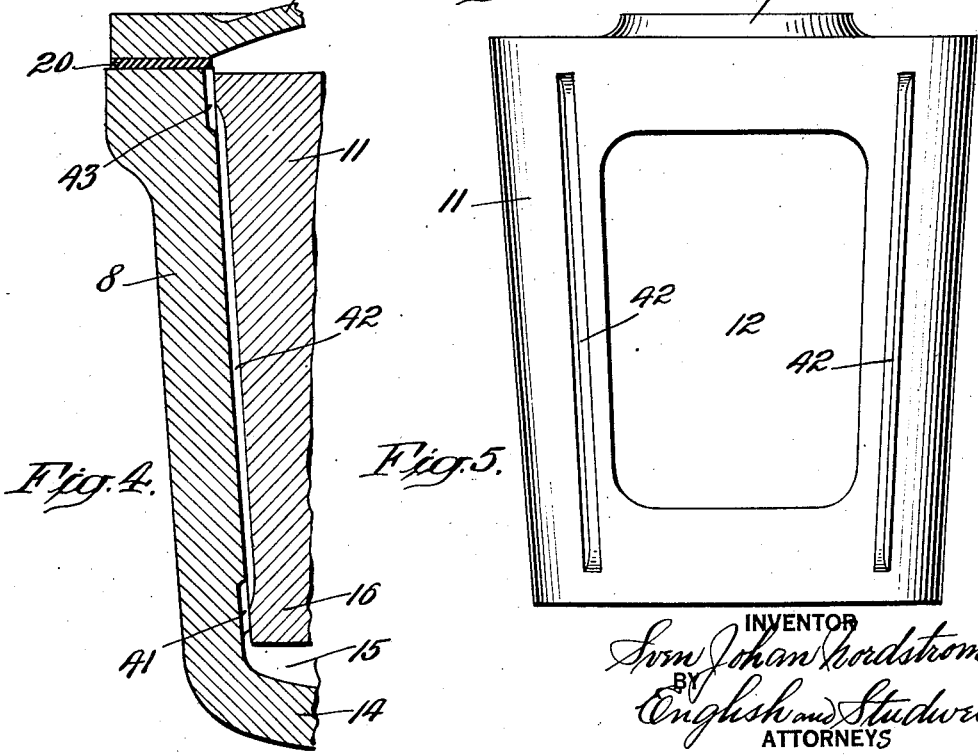

The preferred embodiment of the invention is illustrated in the accompanying drawings in which Fig. 1 is a longitudinal section through one form of the improved valve, and showing the plug in closed position; Fig. 2 is a transverse section taken on the line 2—2 of Fig. 1; Fig. 3 is a longitudinal section taken on the line 3—3 of Fig. 1; Fig. 4 is a detail longitudinal section of the plug and casing to illustrate the cooperating lubricating grooves in them; Fig. 5 is a side elevation of the plug removed from the casing; and Fig. 6 is a view of a modified form of valve embodying the invention, the figure being a transverse section with the plug shown in open position.

The improved valve, as shown in Figs. 1 to 5, comprises a casing 8 having a fluid passageway 9 extending therethrough and a tapered bore or valve seat 10 formed transversely of the passageway. Rotatably positioned in the valve seat 10 is a tapered plug 11 for controlling the flow of fluid through the passageway 9. The plug 11 is provided with a hole 12 which registers with the passageway 9 when the valve is open and which is out of registry with the passageway when the plug is turned to closed position, as shown in Fig. 1. The casing is closed at the smaller end of the bore or valve seat 10 by the enlargement 14 which is preferably integral with the casing and which provides a chamber 15 exposed to the smaller end 16 of the plug and into which the smaller end of the plug preferably projects. The casing at the larger end of the bore or valve seat 10 is closed by a cover 17 secured to the flanged portion 18 of the casing by means of the cap screws 19, and thus the cover 17 becomes in effect an integral part of the casing. Interposed between the cover 17 and the flange 18 is a gasket 20. The cover 17 is resilient or yielding in response to conditions within the valve casing, and is utilized to hold the plug 11 against the seat 10, as will presently appear.

The means for turning the plug 11 to open and close the valve is a tubular member 21 rotatably mounted in a central bore 22 in the cover 17. The inner end 24 of the plug-turning member 21 is preferably squared and is loosely received in a squared recess 25 sunk in the boss-like protuberance 26 formed on the larger end of the plug 11. The outer end 27 of the plug-turning member 21 is shaped to receive a tool by which it may be manipulated to turn the plug 11 to open and close the valve. In the illustrated valve the plug 11 may be turned through 360°, or if preferred, the usual stops may be provided to limit the turning of the plug 11 to 90°.

The means for cooperating with the cover 17 to exert pressure on the larger end of the plug 11 to force it against its seat and simultaneously therewith to exert pressure in the opposite direction on the plug-turning member 21 to establish a tight joint between it and the cover is a threaded sleeve or hollow jack 29 concentric with the tubular plug-turning member 21 and movably mounted therein. The outer ends of the tubular plug-turning member 21 and the tubular pressure member or jack 29 are in threaded engagement with each other and for this purpose the member 21 is provided with an internal thread and the member 29 is provided with a cooperating external thread. The inner surface of the inner end of the member 21 and the exterior surface of the inner end of the member 29 are in closely fitting engagement. The outer extremity of the member 29 is formed to receive a turning tool and the inner extremity of the member 29 bears against the outer surface of a non-resilient packing ring 28 the inner surface of which bears against a shoulder 30 formed on the inner end of a lubricator nipple 31 the inner extremity of which is threaded into the central bore 37 in the larger end of the plug 11 so that the inner surface of the shoulder 30 is in tight engagement with the outer surface of the larger end of the plug. The packing ring 28 is preferably composed of an expansible metal, such as copper or the like, which when expanded laterally under the action of the pressure member 29 to fill the space to be sealed is non-yielding longitudinally.

When the pressure member 29 is turned inwardly it acts through the packing 28 and the shoulder 30 against the larger end of the plug to move the plug longitudinally, and in case the plug is of the tapered type, as in the illustrated valve, the plug is forced into snug engagement with its valve seat 10. The counter action of the pressure member 29, when it is turned inwardly, is outwardly longitudinally against the plug-turning member 21 and serves to force the collar 32 formed on the inner end of the member 21 tightly against the annular seat 33 formed on the inner surface of the cover 17 around the bore 22 in which the member 21 is rotatably mounted. When the collar 32 is forced against the seat 33 under the action of the pressure member 29 a joint is provided at this point which effectually prevents leakage of the line fluid to the exterior, even when the line fluid is under the highest pressures. The provision of the member 29 for acting on the larger end of the plug and on the collar 32 and moving them in opposite directions, the first against the seat and the latter against the cover, enables the cover to hold the plug against the seat with controlled or adjustable force or pressure.

To lubricate the coacting valve surfaces of the plug 11 and its seat 10 in the casing and to fill the chamber 35 formed between the larger end of the plug and the cover 17 with lubricant under pressure to seal the joints between the collar 32 and its seat 33 in the cover and the joints around the packing 28, the valve as illustrated in Fig. 1 is provided with the lubricator nipple 31 which is a tubular member the inner end of which communicates with the outer end of a duct 36 formed entirely within the plug 11 and extending from the central bore 37 in the larger end of the plug down to the chamber 15. The outer end of the lubricator nipple 31 is internally threaded to receive a screw 38 provided with an operating head 39. Within the nipple 31 and beyond the inner end of the screw 38 is a conventional check valve 40 to prevent outflow of lubricant. By filling the outer end of the nipple 31 with lubricant of proper viscosity and turning inwardly on the screw 38 the lubricant passes through the duct 36 into and fills the chamber 15 and thereby exerts longitudinal pressure on the plug 11 to urge it toward the resilient cover. In case the plug 11 is tapered this movement will unseat the plug slightly. To cause the lubricant under pressure to smear over the contacting surfaces of the plug 11 and seat 10 the inner or smaller end of the seat or bore 10 is provided with four short longitudinally-arranged grooves 41 spaced substantially 90° apart, and the exterior surface of the plug 41 is provided with four longitudinally extending grooves 42 the lower or inner ends of which overlap the grooves 41 when the plug is in either closed or open position. In any other position of the plug the grooves 42 are out of communication with the grooves 41 and in such intermediate positions no lubricant under pressure is admitted to the grooves 42. The outer or larger end of the seat or bore 10 is provided with four short longitudinally extending grooves 43 positioned respectively in line with the grooves 41 and with which the outer ends of the grooves 42 register when the plug is in substantially its open and closed positions. By means of this arrangement of the lubricating grooves, when the plug is in substantially its open and closed positions, lubricant under pressure travels from the chamber 15 up through the grooves and into the chamber 35. By using lubricant of proper viscosity and by properly proportioning the cross sectional areas of the grooves 42, the pressure in the chamber 35 will be substantially less than the pressure in the chamber 15, and this differential in pressures will permit the plug to be moved longitudinally of its seat.

In the modified form of the invention illustrated in Fig. 6, the valve is shown in open position and comprises a casing 45 having a tapered plug 46 positioned in the tapered bore or valve seat 47. The casing at the smaller end of the tapered bore 47 is closed by the enlargement 48 which forms the chamber 49 into which the smaller end 50 of the plug projects. In this form of the invention the larger end of the tapered bore is closed by a non-resilient cover 52 secured to the flanged portion 53 of the casing by cap screws 54. A tight joint is made between the cover 52 and the flange 53 by the gasket 55.

The plug 46 is turned by means of the tubular member 57 rotatably mounted in a central bore 51 in the cover 52. The inner end of the member 57 is provided with a surface in the form of an annular flange or collar 58 the upper surface of which bears against the under surface of a resilient washer 56 the outer surface of which in turn bears against the seat 59 formed on the inner surface of the cover 52 around the bore 51. The washer thus becomes a part of the cover and renders it resilient for yieldingly holding the plug 46 against its seat 47. Pins 60 extending partly into the collar 58 and partly into the larger end of the plug serve to establish a driving connection between the member 57 and the plug. The outer end 61 of the plug-turning member 57 is formed to receive a wrench for manipulating the plug to open and close the valve.

The means for moving the plug in one direction and the plug-turning member in the opposite direction to establish a tight joint between the collar 58 and the washer 56 and between the washer and the seat 59 comprises a set screw 63 threaded into the outer end of the member 57. Interposed between the inner end of the screw 63 and the larger end of the plug are two non-compressible thrust buttons 64 and 65 which hold between them a packing 66 consisting of an expansible metal, such as copper or the like, which when it is expanded laterally and tightly engages the adjacent inner surfaces of the tubular member 57 can not be compressed further, and thus the members 64, 65 and 66 in conjunction with the screw 63 hold the plug against its seat and the plug-turning member in a non-leakable joint with the cover 52.

The lubricant for moving the plug longitudinally toward the cover 52 and for filling the chamber 68 between the larger end of the plug and the cover to seal the joints at the seat 59 and the joint between the packing 66 and the member 57 is introduced into the chamber 49 through the fitting 70. Lubricant is conveyed to the contacting valve surfaces of the plug and seat and to the chamber 68 by means of the short channels 71 in the casing, the relatively long channels 72 in the surface of the plug and the short channels 69 in the casing. By reason of the interposition of the resilient washer 56 between the collar 58 and non-resilient cover 52 and the provision of the screw 63 which acts inwardly against the plug 46 and outwardly against the collar or flange 58, the modified form of valve functions like the valve shown in Figs. 1 to 5.

Having thus described the invention, what I claim as new is:

1. A valve comprising a casing having a passageway therethrough and a tapered seat formed transversely of the passageway, a tapered plug mounted in the seat and having a hole adapted to register with the passageway, resilient means acting in the direction to hold the plug against its seat, a plug-turning member rotatably associated with the resilient means and having a surface bearing against the inner surface of the resilient means, the inner end of the plug-turning member and the larger end of the plug having cooperating parts whereby the plug may be turned, and adjustable means acting outwardly against the plug-turning member and inwardly against the plug to control the pressure with which the plug is held against the seat.

2. In a valve comprising a casing having a passageway therethrough and a tapered seat formed transversely of the passageway, a tapered plug mounted in the seat and having a hole adapted to register with the passageway, a resilient cover closing the larger end of the seat and acting in the direction to force the plug against the seat, a member rotatably mounted in the cover and having a surface arranged to move toward the inner surface of the cover to form a tight joint therewith, and adjustable means acting against the plug and against the rotatable member for controlling the force with which the cover holds the plug against the seat and with which the rotatable member is held against the cover.

3. A valve comprising a casing having a passageway therethrough and a tapered seat formed transversely of the passageway, a tapered plug mounted in the seat and having a hole adapted to register with the passageway, a resilient cover closing the larger end of the seat and acting in the direction to force the plug against the seat, there being a space between the larger end of the plug and the cover forming a lubricant chamber, a member for turning the plug rotatably mounted in the cover, the inner end of the plug-turning member and the adjacent end of the plug having cooperating parts whereby the plug may be turned, the inner end of the plug-turning member having a surface arranged to seat against the inner surface of the cover, adjustable means acting in one direction against the plug and in the opposite direction against the plug-turning member to move the surface on the plug-turning member against the cover, and means for introducing lubricant under pressure into the chamber to seal the joint between the plug-turning member and the cover.

4. In a valve in which a tapered plug is mounted in a tapered seat in a casing and which has means for supplying lubricant under pressure to the smaller end of the plug to move the plug longitudinally of the seat, a cover for closing the casing at the larger end of the seat, said cover forming with the larger end of the plug a chamber for receiving lubricant, the valve having channels extending from the smaller end of the plug to the chamber to conduct lubricant into the chamber, a rotatable member mounted in the cover and having a surface bearing against the inner surface of the cover, means interposed between the cover and the plug for resiliently holding the plug against the seat, and adjustable means for acting on the resilient means and on the rotatable member to control the force with which the plug is held against the seat and the rotatable member held against the cover.

5. In a valve in which a tapered plug is mounted in a tapered seat in a casing and in which there is means for supplying lubricant under pressure to the plug to move it axially from its seat, a resilient cover for closing and sealing the larger end of the tapered seat and for holding the plug against the seat, means for adjusting the deflection of the cover and thereby the pressure with which the cover holds the plug against the seat, and means separate from the plug cooperating therewith and extending through said cover to turn the plug.

6. In a valve in which a tapered plug is mounted in a tapered seat in a casing and in which there is means for supplying lubricant under pressure to the smaller end of the plug to move the plug axially of the seat, a cover for closing the casing at the larger end of the seat, a detached plug-turning member mounted in the cover and having a surface bearing against the inner surface of the cover, means for resiliently holding the plug against the seat, and adjustable means for acting on the resilient means and on the plug-turning member to control the pressure with which the plug is held against the seat and the plug-turning member held against the cover.

7. In a valve in which a tapered plug is mounted in a tapered seat in a casing and in which there is means for supplying lubricant under pressure to the plug to move it axially from the seat, a cover for closing the casing at the larger end of the seat, said cover forming with the larger end of the plug a chamber for receiving lubricant, the valve having means for conducting lubricant into the chamber, resilient means interposed between the cover and the plug for holding the plug against the seat, and adjustable means acting on the resilient means for adjusting the pressure with which the plug is held against the seat.

8. In a valve in which a tapered plug is mounted in a tapered seat in a casing and in which there is means for supplying lubricant under pressure to the plug to move it axially from its seat, a cover for closing and sealing the larger end of the tapered seat, said cover being provided with a central bore, a tubular plug-turning member rotatably mounted in the bore in the cover, the inner end of the tubular member and the larger end of the plug having cooperating means whereby when the tubular member is rotated the plug is turned, the inner end of the tubular member having an annular flange, a resilient annular washer interposed between the outer side of the flange and the inner side of the cover, and threaded means within the tubular member acting against the larger end of the plug to thereby force the resilient washer adjustably against the inner side of the cover.

9. In a valve in which a tapered plug is mounted in a tapered seat in a casing and in which there is means for supplying lubricant under pressure to the plug to move it axially from its seat, a resilient cover secured to the casing for closing the larger end of the tapered seat and for holding the plug resiliently against the seat, said cover forming with the larger end of the plug a chamber for containing lubricant, thrust transmitting means interposed between the cover and the larger end of the plug, and means for introducing lubricant into the chamber to lubricate the joint between the thrust transmitting means and the cover and the joint between the thrust transmitting means and the plug.

10. In a valve in which a tapered plug is mounted in a tapered seat in a casing and in which there is means for supplying lubricant under pressure to the plug to move it axially from its seat, a resilient cover for closing and sealing the larger end of the tapered seat and for holding the plug resiliently against the seat, said cover having a central bore, a tubular plug-turning member mounted in the bore, the inner end of the tubular member and the larger end of the bore having cooperating parts whereby the rotation of the tubular member turns the plug, the tubular member being provided with an annular flange which cooperates with the inner surface of the cover adjacent the central bore therein to form a tight joint therewith, a second tubular member threaded in the tubular plug-turning member, a lubricator nipple mounted in the second tubular member and having a flange at its inner end engaged by the inner end of the second tubular member and adapted to press against the larger end of the plug, the turning of said second tubular member serving to force adjustably the lubricator nipple against the plug and the flange on the plug-turning member against the inner surface of the cover.

11. In a valve in which a tapered plug is mounted in a tapered seat in a casing and in which there is means for supplying lubricant under pressure to the plug to move it axially from its seat, a resilient cover for closing and sealing the larger end of the tapered seat and for holding the plug resiliently against the seat, said cover having a central bore, a tubular plug-turning member mounted in the bore, the inner end of the tubular member and the larger end of the bore having cooperating parts whereby the rotation of the tubular member turns the plug, the tubular member being provided with an annular flange which cooperates with the inner surface of the cover adjacent the central bore therein to form a tight joint therewith, an adjustment member threaded in the tubular plug-turning member, the inner end of the adjustment member engaging the larger end of the plug, the turning of the adjustment member in the tubular member serving to regulate the pressure with which the cover holds the plug against the seat.

12. In a valve in which a tapered plug is mounted in a tapered seat in a casing, means for moving the plug axially of its seat, a resilient cover for closing and sealing the larger end of the tapered seat and for holding the plug against the seat, and means separate from the plug and cooperating therewith and extending through said cover for rotating the plug.

13. In a valve in which a tapered plug is mounted in a tapered seat in a casing, means for moving the plug axially of its seat, means for resiliently holding the plug in its seat, means for adjusting the pressure of the resilient means against the plug, and means separate from the plug and cooperating therewith and extending through said resilient holding means for turning the same.

14. In a valve in which a tapered plug is mounted in a tapered seat in a casing, means for moving the plug axially of its seat, a resilient cover for closing and sealing the large end of the tapered seat and for holding the plug against the seat, means for adjusting the pressure of the resilient cover against the plug, and means separate from the plug and cooperating therewith and extending through said cover for turning the same.

15. In a valve in which a tapered plug is mounted in a tapered seat in a casing, means for moving the plug axially of its seat, means for lubricating the valve seating surfaces, means for resiliently holding the plug in its seat, means for adjusting the pressure of the resilient means against the plug, and means separate from the plug and cooperating therewith and extending through said resilient holding means for turning the same.

16. In a valve in which a tapered plug is mounted in a tapered seat in a casing, means for moving the plug axially of its seat, means for lubricating the valve seating surfaces, a resilient cover for closing and sealing the large end of the tapered seat and for holding the plug against the seat, means for adjusting the pressure of the resilient cover against the plug, and means separate from the plug and cooperating therewith and extending through said cover for turning the same.

17. In a valve in which a tapered plug is mounted in a tapered seat in a casing, said casing forming a lubricant chamber with the small end of the plug, a resilient cover at the large end of the plug and forming therewith a second lubricant chamber, means for introducing lubricant under pressure into the chamber at the small end of the plug for jacking the same from its seat, and means for conducting lubricant to the second lubricant chamber from the first chamber at a substantially reduced pressure.

18. In a valve of the plug type, a casing having a passageway therethrough and a plug seat formed transversely of the passageway, a valve plug rotatably disposed within said seat, lubricant grooves in the seating surface of the valve, means including a hollow stem projecting from said plug for introducing lubricant under pressure to said grooves, and a resilient cover member providing a lubricant chamber at the large end of the plug, said grooves being in communication therewith and being attenuated to produce a pressure lag of the lubricant therein.

19. In a valve in which a tapered plug is mounted in a tapered seat in a casing, a resilient cover for closing and sealing the larger end of the tapered seat and holding the plug against the seat, said cover providing a lubricant chamber, means for supplying lubricant under pressure to move the plug axially from its seat and an attenuated duct for introducing lubricant into said chamber to supply lubricant thereto at a lag in pressure.

20. In a valve in which a tapered plug is mounted in a tapered seat in a casing and forms a lubricant chamber adjacent the smaller end thereof, a resilient cover for closing and sealing the larger end of the tapered seat and holding the plug against the seat, said cover providing a second lubricant chamber, means for supplying lubricant under pressure to said first chamber to move the plug axially from its seat, and a system of passages including an attenuated duct for conducting lubricant from the first chamber to said second chamber at a lag in pressure.

21. In a valve in which a tapered plug is mounted in a tapered seat in a casing, a resilient cover for closing and sealing the larger end of the tapered seat and holding the plug against the seat, said cover providing a lubricant chamber, means for supplying lubricant under pressure to move the plug axially from its seat, an attenuated duct for introducing lubricant into said chamber to supply lubricant thereto at a lag in pressure, and means for adjusting the deflection of the cover and thereby the pressure with which the cover holds the plug against the seat.

22. In a valve in which a tapered plug is mounted in a tapered seat in a casing and which has means for supplying lubricant under pressure to the smaller end of the plug to move the plug longitudinally of the seat, a cover for closing the casing at the larger end of the seat, said cover forming with the larger end of the plug a chamber for receiving lubricant, the valve having attenuated channels extending from the smaller end of the plug to the chamber to conduct lubricant into the chamber at a lag in pressure, a rotatable member mounted in the cover and having a surface bearing against the inner surface of the cover, said cover being formed of resilient material for resiliently holding the plug against the seat, and adjustable means for acting on said plug and on the rotatable member to control the force with which the plug is held against the seat and the rotatable member held against the cover.

23. In a valve in which a tapered plug is mounted in a tapered seat in a casing and which has means for supplying lubricant under pressure to the smaller end of the plug to move the plug longitudinally of the seat, a cover for closing the casing at the larger end of the seat, said cover forming a chamber with the larger end of the plug for receiving lubricant, the valve having channels extending from the smaller end of the plug to the chamber to conduct lubricant into the chamber, a rotatable member mounted in the cover and having a surface bearing against the inner surface of the cover, said cover being formed of resilient material for resiliently holding the plug against the seat, and adjustable means for acting on the cover and on the rotatable member to control the force with which the plug is held against the seat and the rotatable member held against the cover.

24. In a valve in which a tapered plug is mounted in a tapered seat in a casing and in which there is means for supplying lubricant under pressure to the smaller end of the plug to move the plug axially of the seat, a cover for closing the casing at the larger end of the seat, a detached plug-turning member mounted in the cover and having a surface bearing against the inner surface of said cover, said cover being formed of resilient material for resiliently holding the plug against the seat, and adjustable means for acting on the plug and on the plug-turning member to control the pressure with which the plug is held against the seat and the plug-turning member held against the cover.

25. In a valve in which a tapered plug is mounted in a tapered seat in a casing, means to supply lubricant under pressure to move said plug axially from said seat, a resilient cover secured to said casing for closing the larger end of said tapered seat and for holding said plug resiliently against said seat, said cover forming a chamber with the larger end of said plug for containing lubricant, thrust transmitting means located in the chamber and interposed between said cover and the larger end of said plug, and means for introducing lubricant into said chamber at a lower pressure than that of the lubricant which moves the plug axially to lubricate said thrust transmitting means.

26. In a valve of the plug type, a valve casing having a passageway therethrough for flow of fluid and having a tapered seat formed transversely of the passage, a tapered plug rotatably disposed within said seat, a cover for closing said casing and providing a chamber at the large end of the plug, a hollow operating stem separate from the plug and operatively connected thereto extending through the cover and having a sealing shoulder thereon bearing against the inside of the cover, an adjustment member within said stem coacting with the plug and stem to adjust the seating force exerted on the plug, means for jacking the plug by lubricant pressure, and means for introducing lubricant into said chamber at a pressure lagging behind the jacking pressure.

27. In a plug valve, a casing having a passageway therethrough, a valve seat formed transversely of said passageway, a plug seated in said seat and having a port therethrough adapted to register with said passageway, an operating stem passing through said casing and forming an operating connection with said plug, said stem having sealing surfaces coacting with complementary sealing surfaces on said casing, means for introducing lubricant under pressure to said sealing surfaces to prevent leakage therethrough, means for yieldingly holding said plug in its seat, a lubricant chamber adjacent said latter means, means for jacking said plug from its seat comprising a second lubricant chamber, means to connect said lubricant chambers to establish an equilibrium in pressures over a period of time, said means also acting to prevent communication of pressure from said second lubricant chamber to said first lubricant chamber at a sufficiently fast rate to oppose jacking of said plug.

28. In a valve of the plug type, a valve casing having a passageway therethrough for flow of fluid and having a tapered seat formed transversely of the passageway, a tapered plug rotatably disposed within said seat, a cover for closing said casing and providing a chamber at the large end of the plug, a hollow member extending through the cover and having a shoulder thereon bearing against the inner face of the cover, an adjustment member within said hollow member coacting therewith, a nonresilient sealing means between said adjustment member and said plug, means for jacking said plug by lubricant pressure, and means for introducing lubricant in said chamber to provide a plastic seal about said hollow member.

SVEN JOHAN NORDSTROM.